(12) United States Patent
Kurohori et al.

(10) Patent No.: US 6,598,927 B2
(45) Date of Patent: Jul. 29, 2003

(54) WINDSHIELD FOR VEHICLE

(75) Inventors: Seiichi Kurohori, Saitama (JP); Takashi Ozeki, Saitama (JP); Shinji Furuta, Saitama (JP); Hiroyoshi Kobayashi, Saitama (JP); Hirosi Takamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,543

(22) Filed: Sep. 6, 2001

(65) Prior Publication Data

US 2002/0027370 A1 Mar. 7, 2002

(30) Foreign Application Priority Data

Sep. 6, 2000 (JP) ........................................ 2000-270711

(51) Int. Cl.⁷ .................................................. B60J 1/00
(52) U.S. Cl. ........................ 296/79; 296/96.21; 296/201
(58) Field of Search ...................... 296/78.1, 79, 96.21, 296/200, 201

(56) References Cited

U.S. PATENT DOCUMENTS

| | | | | |
|---|---|---|---|---|
| 1,292,610 A | * | 1/1919 | Jackson | 296/78.1 |
| 1,360,945 A | * | 11/1920 | Harley | 296/78.1 |
| 1,877,609 A | * | 9/1932 | Stern et al. | 296/78.1 |
| 3,284,130 A | * | 11/1966 | Micheal | 296/78.1 |
| 4,066,291 A | * | 1/1978 | Hickman | 296/78.1 |
| 4,184,000 A | * | 1/1980 | Denman | 156/313 |
| 4,325,448 A | * | 4/1982 | Pivar | 296/78.1 |
| 4,336,964 A | * | 6/1982 | Pivar | 296/78.1 |
| 4,343,503 A | * | 8/1982 | Samuelson et al. | 296/96.21 |
| 4,372,602 A | * | 2/1983 | Tsuchiya et al. | 296/78.1 |
| 4,440,436 A | * | 4/1984 | Giddens et al. | 296/78.1 |
| 4,772,065 A | * | 9/1988 | Nakata et al. | 296/96.21 |
| 4,773,695 A | * | 9/1988 | Jones et al. | 296/96.21 |
| 4,988,142 A | * | 1/1991 | Chandler et al. | 296/201 |
| 5,072,987 A | * | 12/1991 | Allen | 296/79 |
| 5,139,302 A | * | 8/1992 | Kanke | 296/201 |
| 5,620,794 A | * | 4/1997 | Burkart et al. | 296/201 |
| 6,010,173 A | * | 1/2000 | Chyan-Luen | 296/78.1 |
| 6,284,360 B1 | * | 9/2001 | Johnson et al. | 428/317.7 |
| 6,406,782 B2 | * | 6/2002 | Johnson et al. | 428/317.7 |

FOREIGN PATENT DOCUMENTS

JP        Y22515092      2/1996

* cited by examiner

*Primary Examiner*—D. Glenn Dayoan
*Assistant Examiner*—Lori L Coletta
(74) *Attorney, Agent, or Firm*—Birch, Stewart, Kolasch & Birch, LLP (57) ABSTRACT

A vehicular windshield is provided which eliminates the need for a hard coating and which is relatively light in weight. The vehicular windshield includes a glass surface to be wiped by a wiper, and includes a transparent resin windshield main body. The windshield main body has upper and lower mounting portions for mounting the windshield main body to a roof and a front frame of a vehicle. A glass plate is fastened to the windshield main body to form the surface for a wiper. An adhesive sheet is provided for fastening the glass plate to the windshield main body.

13 Claims, 10 Drawing Sheets

FRONT ← → REAR

BACKGROUND ART

WINDSHIELD FOR VEHICLE

BACKGROUND OF THE INVENTION

1. Field of the Invention

The present invention relates to a windshield for a vehicle, which has a surface to be wiped by a wiper.

2. Description of the Relevant Art

Figure 10:
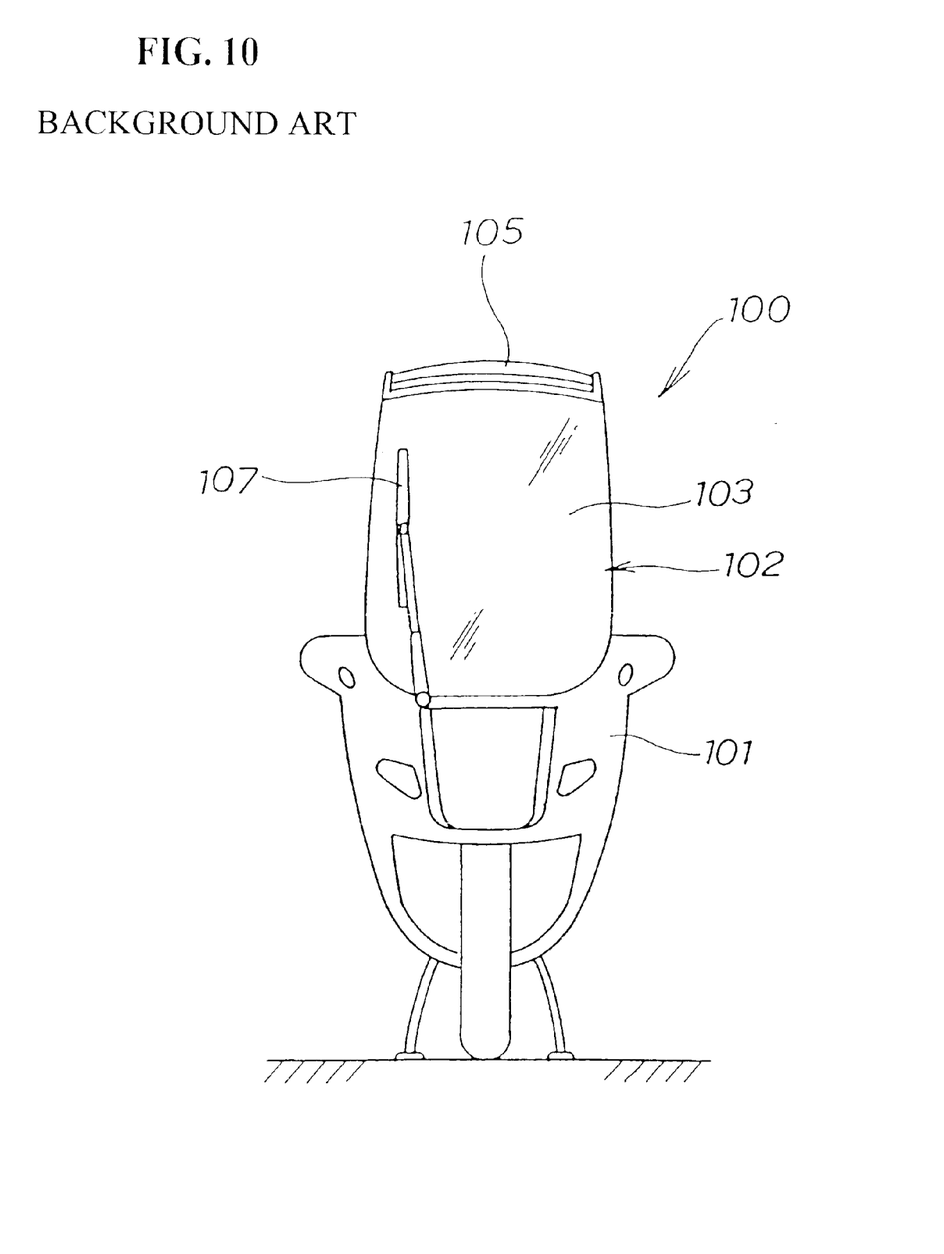
FIG. 10 is a front view of a scooter type vehicle, in accordance with the background art.

Front windshields or front screens are known. For example, Japanese Utility Model Registration No. 2515092, titled "Frame Structure of Scooter Type Vehicle," proposes a windshield. FIG. 10 illustrates the windshield of a scooter type vehicle, in accordance with the background art.

FIG. 10 is a front view of the windshield 102 of the scooter type vehicle 100, in accordance with the background art. The scooter type vehicle 100 is so constructed that the windshield 102 is mounted to a vehicle body cover 101. The top end of the windshield 102 is supported by a roof 105, and a surface 103 of the windshield 102 is wiped by a wiper 107.

The windshield 102 is a member formed from a transparent resin, such as polycarbonate. The windshield is therefore lower in hardness than glass plate and is liable to flaw or scratch. In order to obviate the flawing, a hard coating is formed on the surface 103 of the windshield 102, thereby protecting the surface 103 of the windshield 102 from the wiper 107. However, the hard coating is expensive, leading to an increased cost for the windshield 102.

In order to eliminate the need for the hard coating, one might be lead to form the windshield of a glass plate. However, when the windshield is formed of a glass plate, the weight of the windshield becomes large, and this is a major drawback.

Accordingly, there exists a need in the background art for a windshield for a vehicle, which can eliminate the need for a hard coating and which is relatively light in weight.

SUMMARY OF THE INVENTION

It is an object of the present invention to address one or more of the drawbacks associated with the background art.

It is an object of the invention to provide a windshield having a suitable hardness on a surface thereof which is wiped by a wiper, and to have a suitable weight.

In order to attain the above objects, the present invention provides a windshield for a vehicle, including a surface to be wiped by a wiper. The windshield includes a windshield main body molded from a transparent resin, a mounting portion for mounting the windshield main body to a vehicle main body, and a glass plate fastened to said windshield main body and wiped by the wiper.

The surface wiped by a wiper is formed of a glass plate. The other portions of the windshield are formed of the transparent resin. Since the wiper-wiped surface is formed by the glass plate, the risk or possibility of flawing or scratching is greatly reduced or eliminated.

In addition, since the glass plate is used for only the wiper-wiped surface of the windshield, and the other portions are formed from a lightweight transparent resin, it is possible to keep a weight of the windshield reduced.

One embodiment of the present invention is characterized in that the windshield main body is provided with a picture frame-like opening, and the glass plate is fitted therein. Since the glass plate is bonded to only the frame of the windshield main body, it suffices to bond only the outer periphery of the glass plate to the shield main body. Therefore, the glass plate can be easily bonded to the windshield main body.

Another embodiment of the present invention is characterized in that the windshield main body is provided with a recessed portion corresponding to the outer frame and the thickness of the glass plate, and the glass plate is fitted in the recessed portion.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
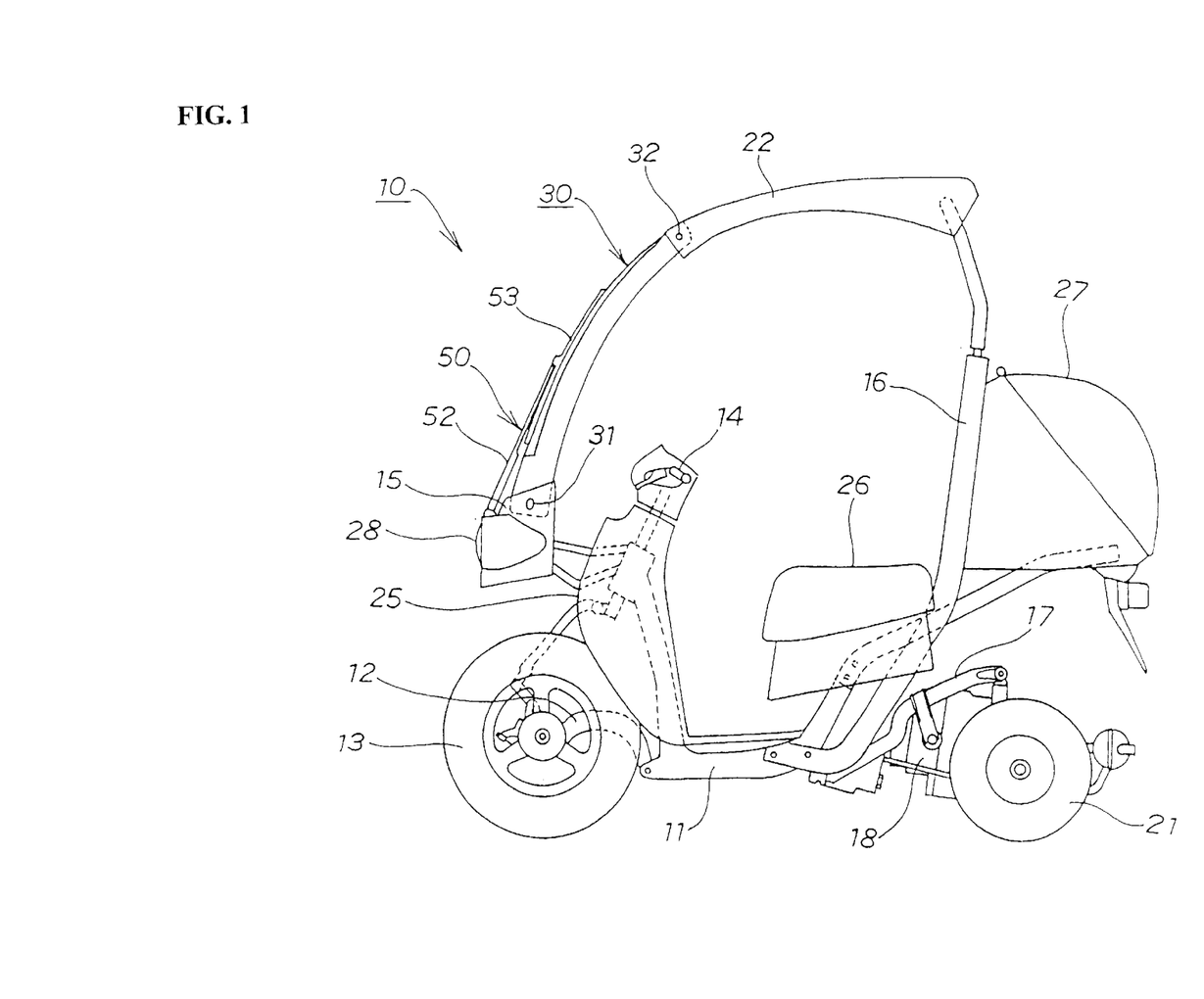
FIG. 1 is a side view of a vehicle including a windshield, according to a first embodiment the present invention.

In the following description, "front", "rear", "left" and "right" are as viewed from a driver's perspective and a normal travel direction for the vehicle. FIG. 1 is a side view of a vehicle, such as a motor tricycle, including a vehicular windshield according to a first embodiment of the present invention.

The vehicle 10 includes a front wheel 13 mounted to a vehicle body frame 11 through a swing arm 12. A handle bar 14 and a front frame 15 are connected to an upper portion of the vehicle body frame 11. A pole 16 is connected to a central lower portion of the vehicle body frame 11. A power unit 18 (a combination of an engine and a transmission) is supported by the pole 16 and the vehicle body frame 11 through a lower frame 17.

Figure 2:
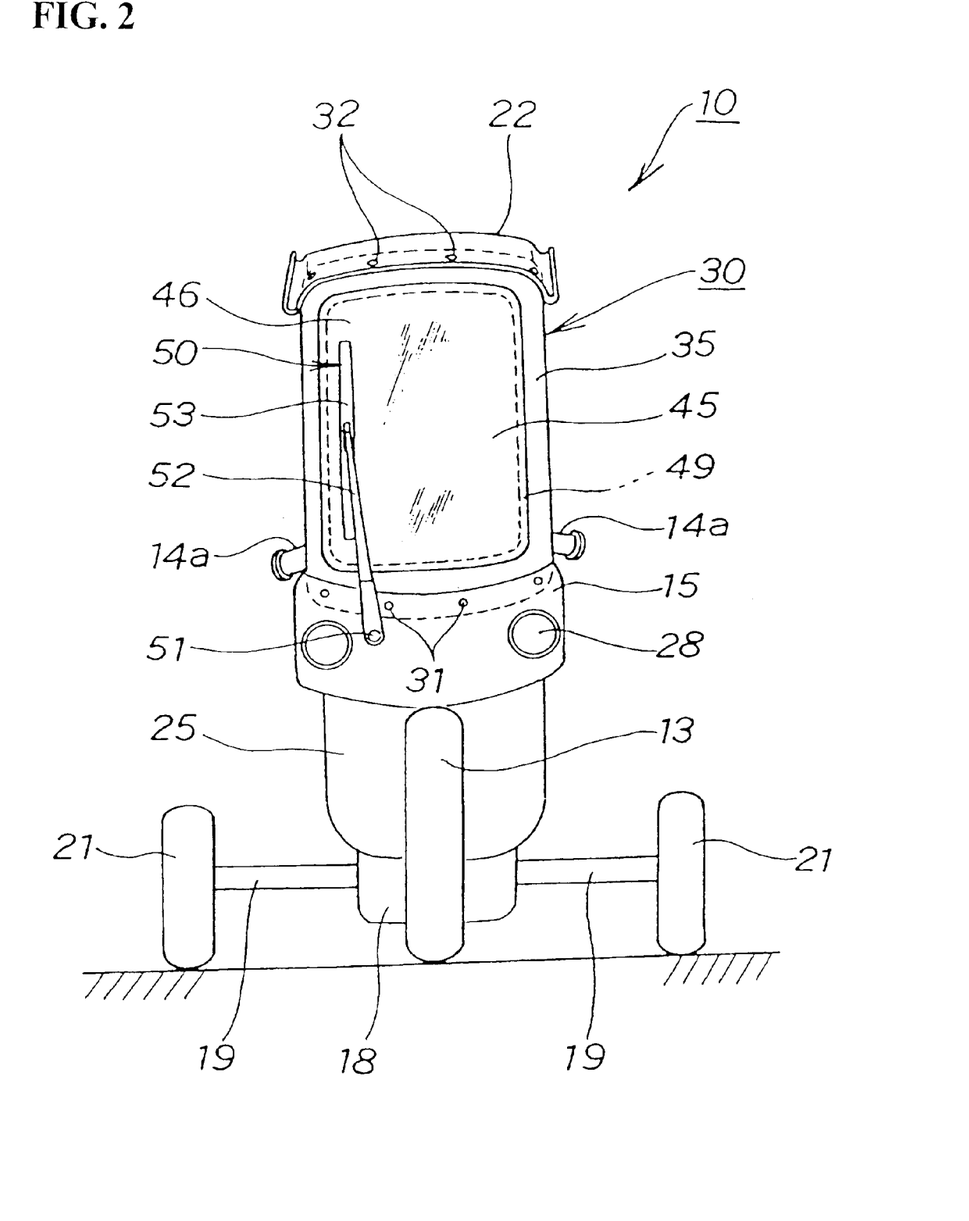
FIG. 2 is a front view of the vehicle of FIG. 1.

Rear wheels 21 are connected to the power unit 18 through an axle shaft 19 (shown in FIG. 2). A roof 22 is connected to the top end of the pole 16. A vehicular windshield 30 is mounted between the roof 22 and the front frame 15. Further, a wiper 50 is connected to the front frame 15. The vehicle further includes a front cover 25, a seat 26, a luggage box 27, a head light 28, and grips 14a.

FIG. 2 is a front view of the vehicle including the windshield, according to the first embodiment of the present invention. FIG. 2 shows the condition where the lower end of the windshield 30 is fastened to the front frame 15 by bolts 31. The upper end of the windshield 30 is also fastened to the roof 22 by bolts 32. Further, a wiper 50 is provided on the front frame 15.

The wiper 50 includes a wiper arm 52, supported by a driving shaft 51. A wiper blade 53 is connected to the top end of the wiper arm 52. The wiper 50 is so constructed that the wiper arm 52 is swung by the driving shaft 51, whereby the surface of the windshield 30 is wiped by the wiper blade 53.

Figure 3:
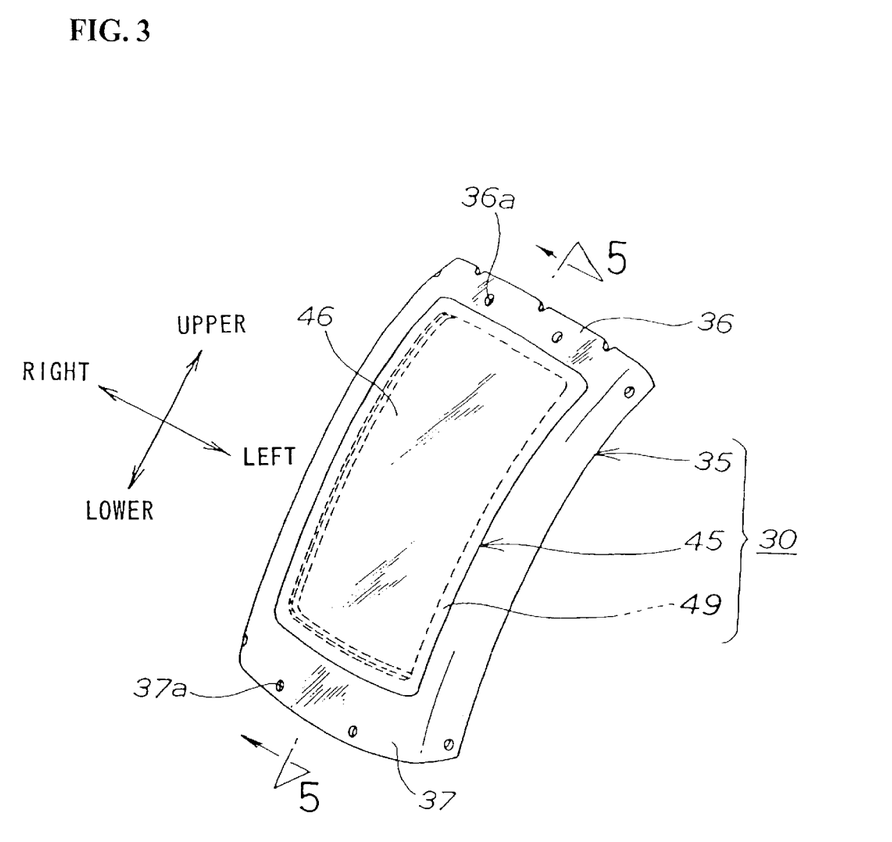
FIG. 3 is a perspective view of a windshield of the vehicle of FIG. 1.

FIG. 3 is a perspective view of the windshield according to the first embodiment of the present invention. The windshield 30 is a member comprising a wiper-wiped surface 46 to be wiped by the wiper 50 (shown in FIG. 2) and a transparent resin-made shield main body 35. The transparent resin-made shield main body 35 includes mounting portions (upper and lower mounting portions) 36, 37 for mounting the windshield to the vehicle body (the roof 22 and the front frame 15 shown in FIG. 2). A glass plate 45 is fastened to the shield main body 35 to form the wiper-wiped surface 46. An adhesive sheet 49 is provided for fastening the glass plate 45 to the shield main body 35.

Figure 4:
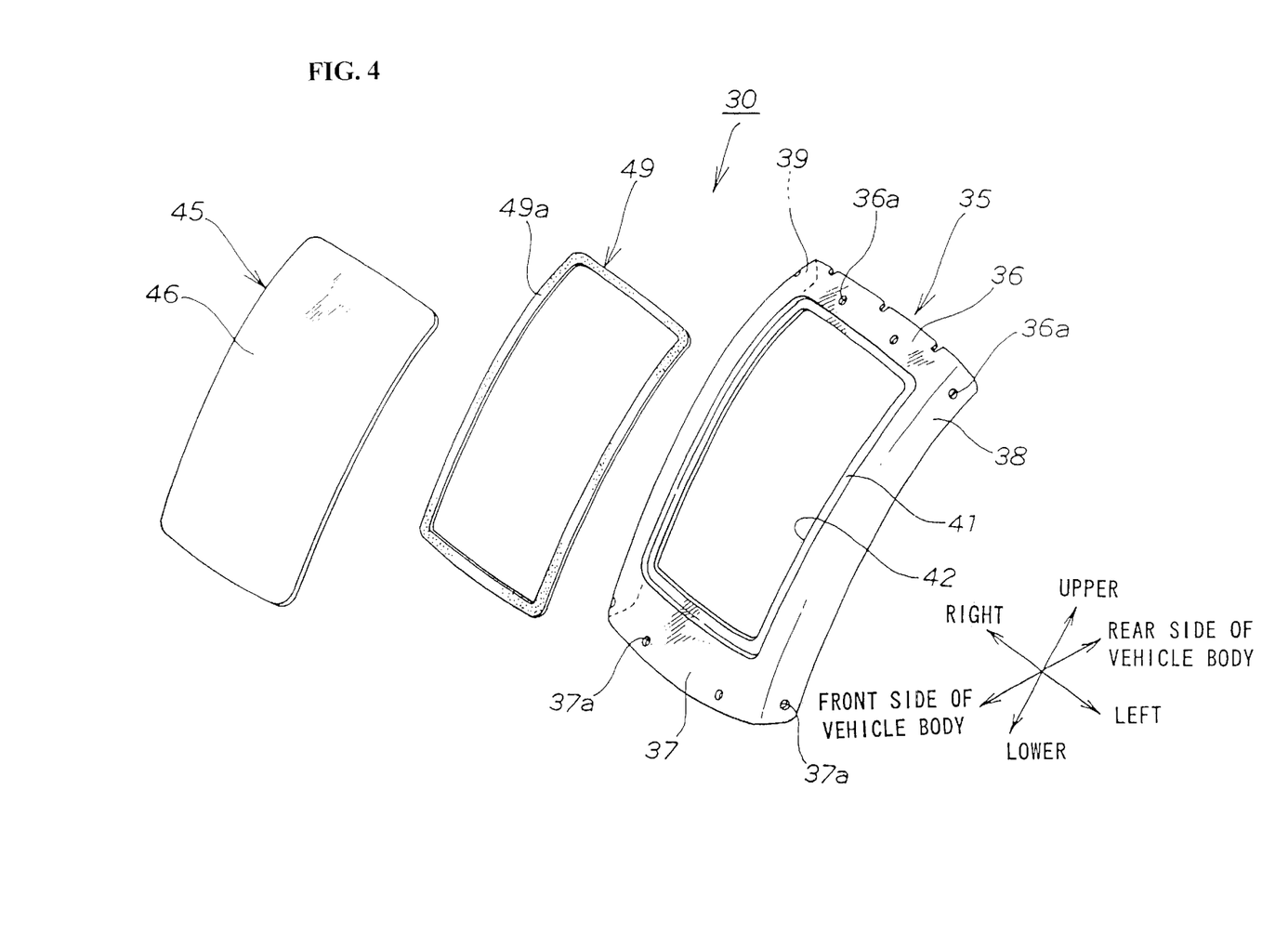
FIG. 4 is an exploded perspective view of the windshield of FIG. 3.

FIG. 4 is an exploded perspective view of the vehicular windshield, according to the first embodiment of the present invention. The shield main body 35 is formed from a transparent resin, such as polycarbonate in a shape curved in the vertical direction. The shield main body 35 comprises left and right bent portions 38 and 39 bent to the rear side of the vehicle at left and right side portions thereof. Further, the shield main body 35 includes the upper and lower mounting portions 36, 37 for mounting the same to the roof 22 and the front frame 15 (shown in FIG. 2), respectively at the upper and lower ends thereof.

The upper mounting portion 36 includes four mounting holes 36a for mounting the windshield main body to the roof 22. The lower mounting portion 37 includes four mounting holes 37a for mounting the windshield main body to the front frame 15.

The shield main body 35 is provided at its center with a picture frame-like frame 41 and an opening 42 for fitting the glass plate 45. The frame 41 is a stepped portion formed in the shape of a rectangular frame body, so that the glass plate 45 can be fitted into the stepped portion. The inner periphery of the frame 41 defines a rectangular opening 42.

The adhesive sheet 49 is a transparent sheet formed in the shape of the same rectangular frame body as the frame 41 of the shield main body 35. Further, the adhesive sheet 49 is a member which can be disposed on the frame 41 of the shield main body 35.

The glass plate 45 is formed in a rectangular shape so that it can be fitted in the opening 42 of the shield main body 35. Namely, the outer periphery of the glass plate 45 can be fitted into the stepped portion of the frame 41 of the shield main body 35. The glass plate 45 may be, for example, a glass laminate or a tempered glass.

Figure 5:
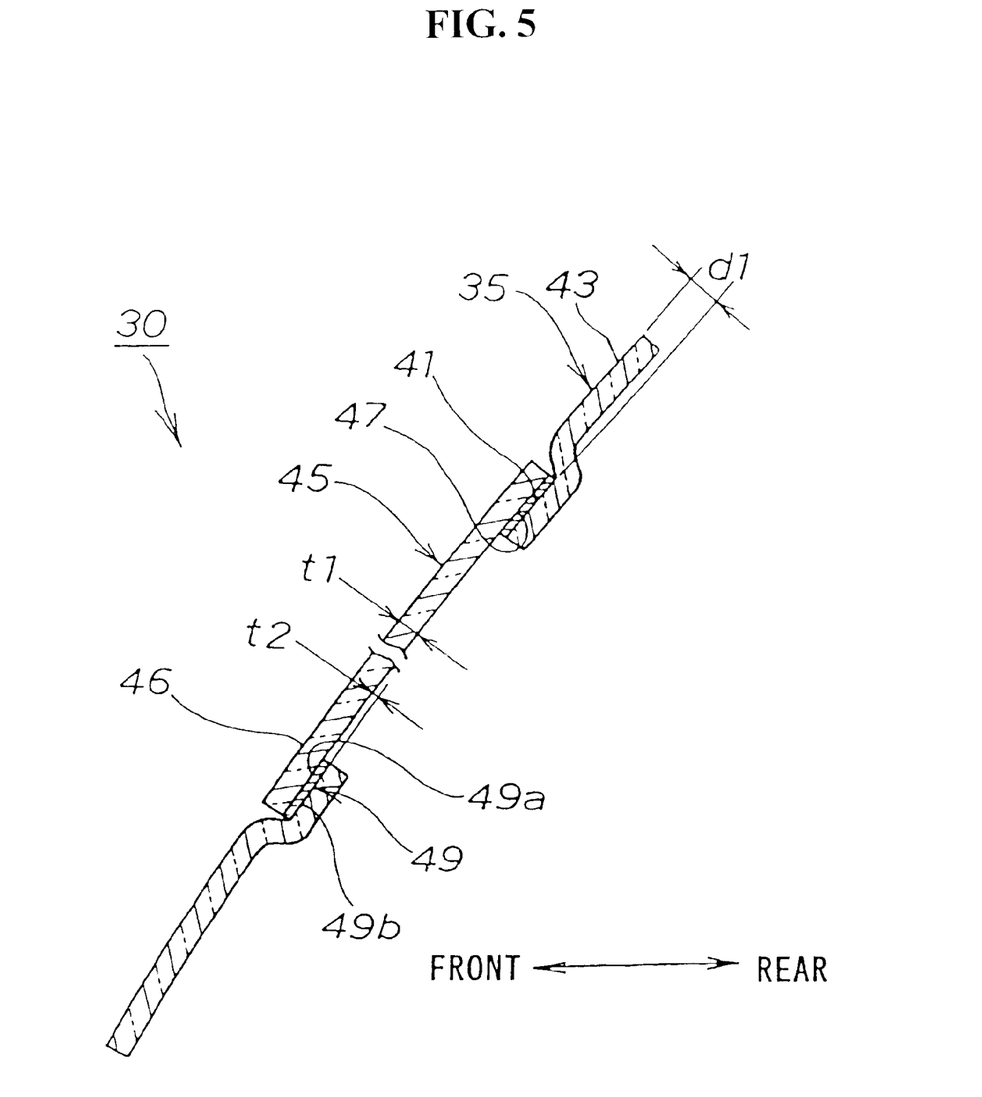
FIG. 5 is a cross-sectional view taken along line 5—5 of FIG. 3.

FIG. 5 is a cross-sectional view taken along line 5—5 of FIG. 3. FIG. 5 shows the condition where the front surface 49a of the adhesive sheet 49 is bonded to the back side outer periphery 47 of the glass plate 45, and the back surface 49b of the adhesive sheet 49 is bonded to the frame 41 of the shield main body 35.

The stepped portion depth d1 of the frame 41 is set to be roughly equal to the sum (t1+t2) of the thickness t1 of the glass plate 45 and the thickness t2 of the adhesive sheet 49. Accordingly, the shield main body 35 can be fitted onto the glass plate 45 so that the wiper-wiped surface (front surface) of the glass plate 45 is flush with the front surface 43 of the shield main body 35.

According to the first embodiment, the shield main body 35 is molded from a transparent resin, and the glass plate 45 is fastened to the shield main body 35. In addition, the glass plate 45 is wiped by the wiper 50 (shown in FIG. 2). Therefore, the wiper-wiped surface 46 of the glass plate 45 has a hardness which is sufficiently high. Accordingly, it is unnecessary to form a hard coating on the wiper-wiped surface 46.

In the windshield 10, the glass plate 45 is used at only the wiper-wiped surface 46. The other portions (e.g. shield main body 35) are formed from the lightweight transparent resin. Therefore, it is possible to keep a weight of the windshield 10 reduced. Further, to assemble the windshield 10, one need only bond the glass plate 45 to the frame 41 of the windshield main body 35. Therefore, the process of bonding the glass plate 45 can be easily carried out without much labor.

By providing the windshield main body 35 in the periphery of the glass plate 45, the windshield main body 35 can also function as a window frame. Therefore, the windshield main body 35 acts as a shock absorber and acts to protect the glass plate 45 from breaking or cracking.

In addition, by surrounding the periphery of the glass plate 45 by the windshield main body 35, when an external force is applied from a lateral side of the windshield main body 35, a side portion of the windshield main body 35 deforms. Thereby, a lateral shock onto the glass plate 45 is lessened by the deformation, and the likelihood of breaking or cracking the glass plate 45 is reduced.

Figure 6:
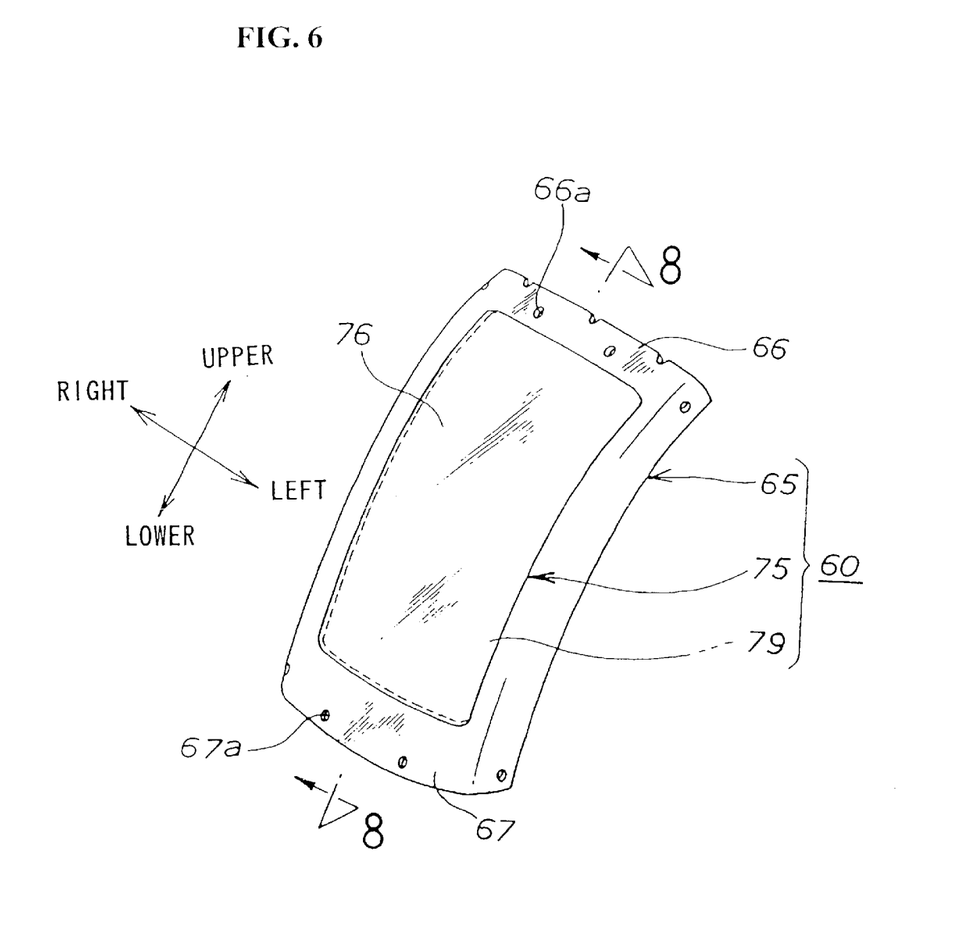
FIG. 6 is a perspective view of a vehicle including a windshield, according to a second embodiment of the present invention.

Next, a second embodiment of the present invention will be described. As to the same members as in the first embodiment, the same reference numerals will be used. FIG. 6 is a perspective view of the windshield for vehicle according to the second embodiment of the present invention.

The windshield 60 is a member including a wiper-wiped surface 76 to be wiped by the wiper 50 (shown in FIG. 2). Further, the windshield includes a transparent resin-made windshield main body 65 having mounting portions (upper and lower mounting portions) 66, 67 for mounting the windshield to the vehicle body (the roof 22 and the front frame 15 shown in FIG. 2). A glass plate 75 is fastened to the windshield main body 65 to form the wiper-wiped surface 76, and an adhesive sheet 79 is provided for fastening the glass plate 75 to the windshield main body 65.

Figure 7:
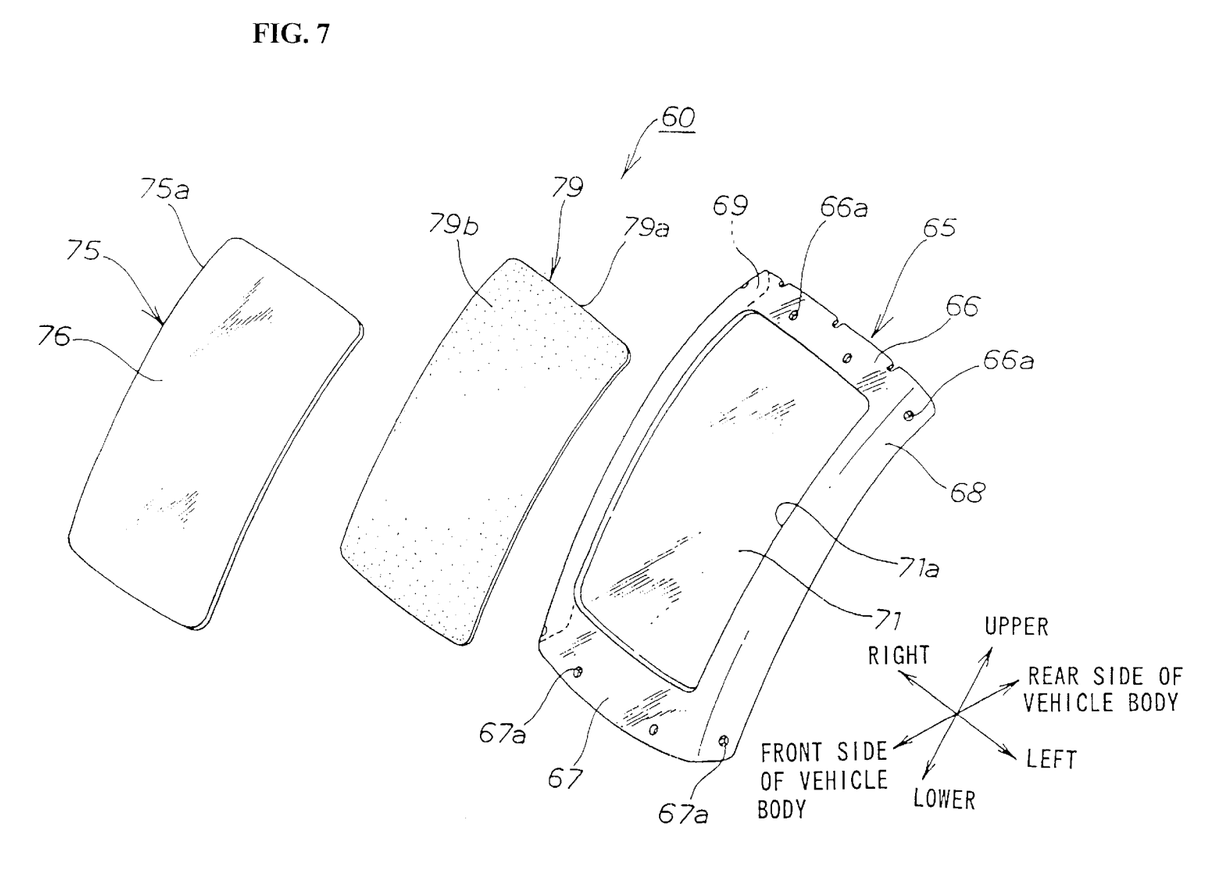
FIG. 7 is an exploded perspective view of the windshield of FIG. 6.

FIG. 7 is an exploded perspective view of the windshield according to the second embodiment of the present invention. The windshield main body 65 is formed from a transparent resin, such as polycarbonate in a shape curved in the vertical direction. The windshield main body 25 includes left and right bent portions 68, 69 bent to the rear side of the vehicle at left and right side portions thereof. Further, the windshield main body 25 includes upper and lower mounting portions 66, 67 for mounting the windshield main body 25 to the roof 22 and the front frame 15 (as shown in FIG. 2), respectively at the upper and lower ends thereof.

The upper mounting portion 66 has four mounting holes 66a for mounting the windshield main body to the roof 22. The lower mounting portion 67 has four fitting holes 67a for mounting the windshield main body to the front frame 15.

The windshield main body 67 is provided at its center with a recessed portion 71 corresponding to an outer frame 75a. The recessed portion 71 is formed in a rectangular shape. Further, the recessed portion is recessed to at least a thickness of the glass plate 75 in order to fit the glass plate 75 therein.

An outer frame 71a of the recessed portion 71 is formed corresponding to the outer frame 75a of the glass plate 75. The outer frame 71a is slightly larger than the outer frame 75a. The depth of the recessed portion 71 is set corresponding to the thickness of the glass plate 75, and set to be slightly (by the thickness of the adhesive sheet 79) larger than the thickness of the glass plate 75.

The adhesive sheet 79 is a rectangular transparent sheet. The adhesive sheet has an outer frame 79a which is formed to be slightly smaller than the outer frame 71a of the recessed portion 71. Further, the outer frame 79a is approximately equal in size to the outer frame 75a of the glass plate 75.

Figure 8:
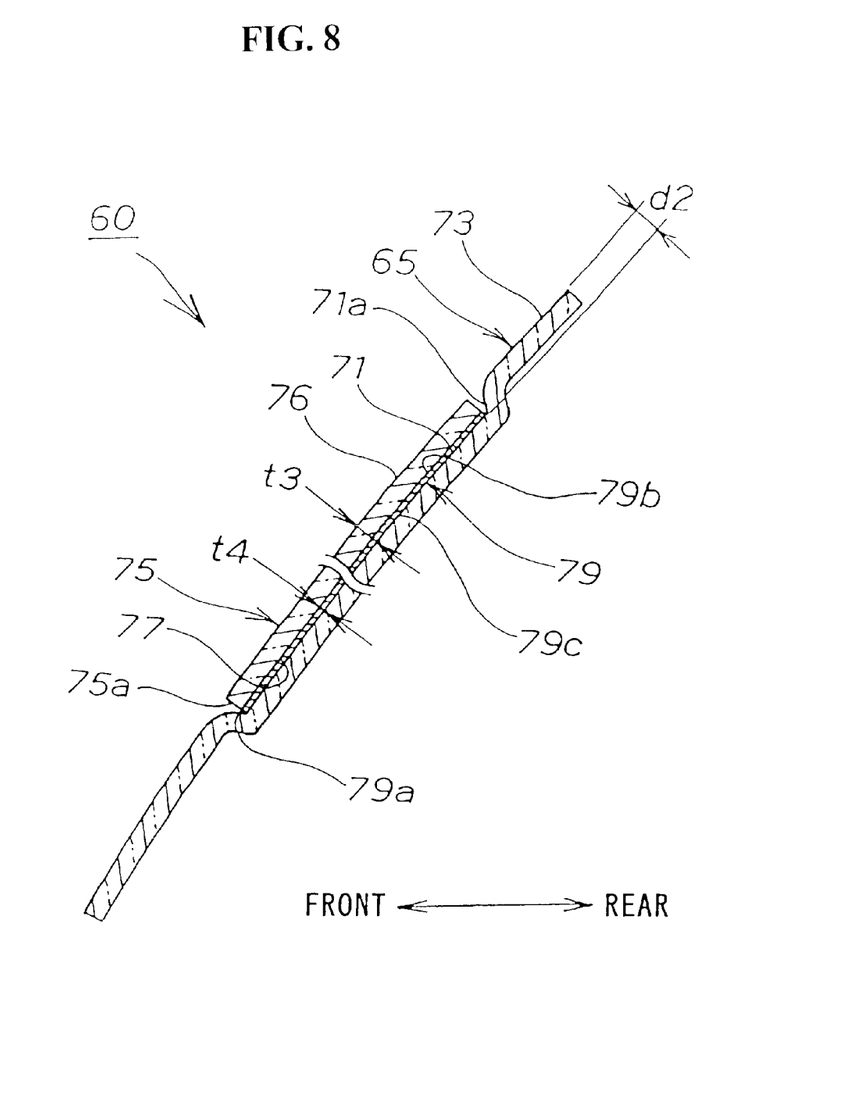
FIG. 8 is a cross-sectional view taken along line 8—8 of FIG. 6.

Since the outer frame 79a of the adhesive sheet 79 is formed equal in size to the outer frame 75a of the glass plate 75, the front surface 79b of the adhesive sheet 79 can be bonded to the whole area of the back surface 77 of the glass plate 75, as shown in FIG. 8. In addition, since the outer frame 79a of the adhesive sheet 79 is formed slightly smaller than the outer frame 71a of the recessed portion 71, the back surface 79c of the adhesive sheet 79 can be bonded to the whole area of the recessed portion 71 of the windshield main body 65, as shown in FIG. 8.

The glass plate 75 is a rectangular plate material, having the outer frame 75a formed slightly smaller than the outer frame 71a of the recessed portion 71. The glass plate 75 may be formed as a glass laminate or a tempered glass. As the glass plate 75, an ordinary plate glass can be used, as will be further explained in relation to FIG. 8 below.

FIG. 8 is a cross-sectional view taken along line 8—8 of FIG. 6. FIG. 8 shows the condition where the front surface 79b of the adhesive sheet 79 is bonded to the back surface 77 of the glass plate 75, and the back surface 79c of the adhesive sheet 79 is bonded to the recessed portion 71 of the windshield main body 65.

The stepped portion depth d2 of the recessed portion 71 is set to be roughly equal to the sum (t3+t4) of the thickness t3 of the glass plate 75 and the thickness t4 of the adhesive sheet 79. Therefore, the glass plate 75 can be fitted so that the wiper-wiped surface (front surface) 76 of the glass plate 75 is flush with the front surface 73 of the windshield main body 65.

Here, the reason why an ordinary plate glass can be used as the glass plate 75 will be described. By fitting the glass plate 75 into the recessed portion 71 of the windshield main body 65, the whole area of the back surface 77 of the glass plate 75 can be bonded to the whole area of the recessed portion 71 through the adhesive sheet 79. Therefore, a three-layer structure consisting of the glass plate 75, the adhesive sheet 79 and the recessed portion 71 is obtained. By this arrangement, the same constitution and strength as that of a glass laminate can be obtained. Accordingly, an ordinary plate glass can be used as the glass plate 75, and the cost of the windshield 60 can be suppressed.

According to the second embodiment, in the same manner as in the first embodiment, the wiper-wiped surface 76 is formed by the glass plate 75. Therefore, the hardness of the wiper-wiped surface 76 can be enhanced sufficiently. Further, it is unnecessary to form a hard coating on the wiper-wiped surface 76.

In the windshield 69, the glass plate 75 is used only at the wiper-wiped surface 76. The other portions (e.g. windshield main body 65) are formed from a lightweight transparent resin. Therefore, the weight of the windshield is relatively reduced.

Since the windshield main body 65 is provided in the periphery of the glass plate 75, the windshield main body 65 also functions as a window frame. Therefore, the windshield main body 65 acts as a shock absorber, and the glass plate 75 is protected.

Further, by fitting the glass plate 75 into the recessed portion 71 of the windshield main body 65, the whole surface of the glass plate 75 can be bonded to the recessed portion 71. Therefore, the glass plate 75 can be reinforced with the transparent resin, so that the thickness t3 of the glass plate 75 can be reduced. Accordingly, the weight of the windshield 60 can be reduced efficiently.

Since the glass plate 75 can be made to be thin, the glass plate 75 can easily accommodate a deformation when, for example, a torsional deformation is applied to the windshield 60. This arrangement is further advantageous regarding protection of the glass plate 75 from breaking or cracking.

Further, it should be noted that the periphery of the glass plate 75 is surrounded by the windshield main body 65. When an external force is applied from a lateral side of the windshield main body 65, as for example when a side portion of the windshield main body 65 is deformed, a shock upon the glass plate 75 will be alleviated.

Figure 9:
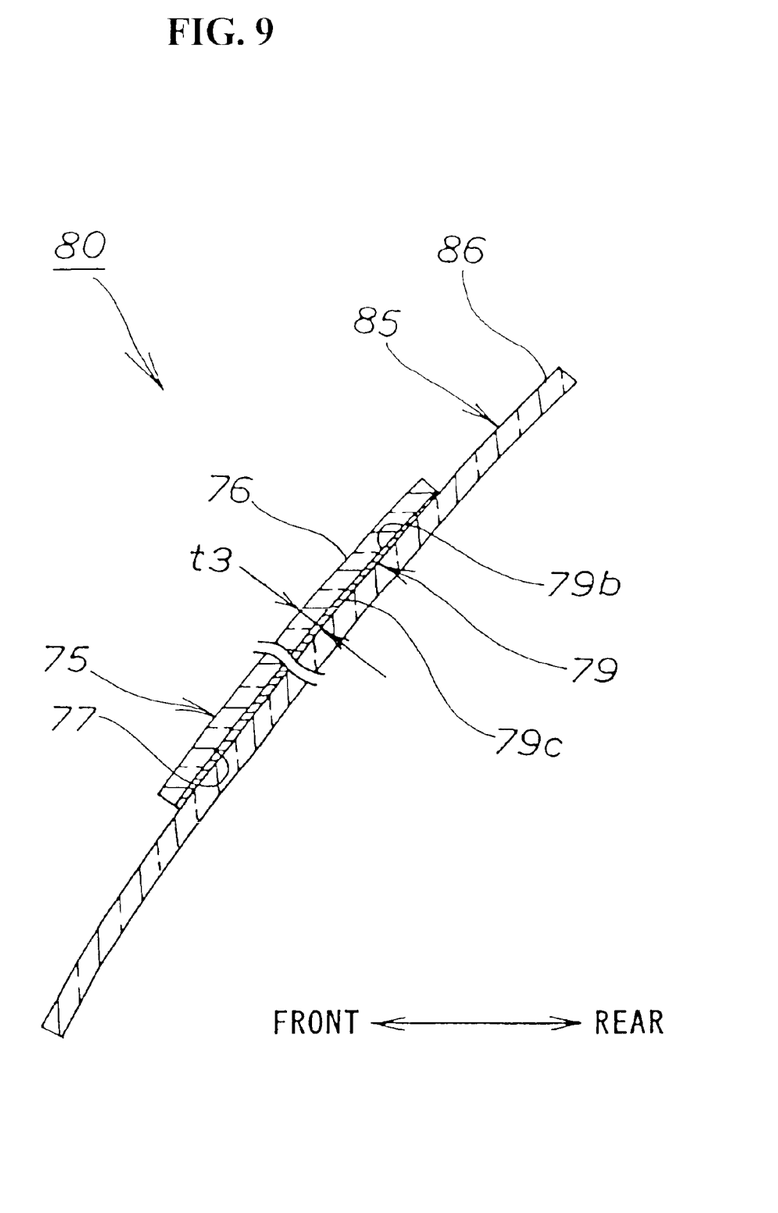
FIG. 9 is a cross-sectional view of a windshield, according to a third embodiment the present invention.

FIG. 9 is a cross-sectional view of a windshield for vehicle according to the third embodiment of the present invention. The windshield 80 is so constructed that the windshield main body 65 in the second embodiment is replaced by a transparent resin-made windshield main body 85. A glass plate 75 is fastened to the front surface 86 of the windshield main body 85 through an adhesive sheet 79. Other structures and arrangements are the same or similar to those illustrated in the second embodiment.

In the third embodiment, the windshield main body 85 may be obtained by removing the recessed portion 71 from the windshield main body 65 of the second embodiment. The other portions taking the same shape as in the windshield main body 65.

According to the third embodiment, the same effects as in the second embodiment can be obtained. In addition, it is needless to provide the windshield main body 85 with a recessed portion for fitting the glass plate 75 therein. Therefore, the windshield main body 85 can be formed more easily, and the cost of the windshield 80 can be further reduced.

While the above embodiments illustrate examples of applying the windshield to a motor tricycle, the windshield could also be applied to other vehicles, such as motorcycles or automobiles. Further, while the above embodiments illustrate forming the windshield main body from a transparent resin such as polycarbonate, the windshield main body could be formed from other resins.

The present invention, configured as above, displays many advantageous effects. According to the present invention, the glass plate is fastened to the windshield main body, whereby the glass plate can be wiped by the wiper. Therefore, the wiper-wiped surface is a surface of the glass plate, so that the hardness of the wiper-wiped surface is enhanced sufficiently. Accordingly, it is unnecessary to form a hard coating on the wiper-wiped surface.

In addition, the glass plate is used only at the wiper-wiped surface of the windshield. The other portions are formed from a lightweight transparent resin. Therefore, the weight of the windshield is relatively reduced.

According to the present invention, the glass plate is bonded only to the frame of the windshield main body, so that only the outer periphery of the glass plate must be bonded to the windshield main body. Therefore, the glass plate can be easily bonded to the windshield main body. Accordingly, cost and assembly time can be suppressed.

According to the present invention, the glass plate is fitted into a recessed portion of the windshield main body, whereby the whole surface of the glass plate can be bonded to the recessed portion. Therefore, the glass plate can be reinforced with the transparent resin, so that it is possible to reduce the thickness of the glass plate. Accordingly, the weight of the windshield can be reduced efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A windshield for a vehicle comprising:
    a windshield main body formed of a transparent resin and provided with an opening, framed by a stepped lip recessed into a forward surface of said windshield main body;
    a glass plate fastened to said windshield main body and covering said opening, wherein said glass plate is at least partially recessed into said windshield main body and includes a surface to be wiped by a wiper; and
    a mounting portion formed on said windshield main body for mounting said windshield main body to a vehicle, wherein said mounting portion includes a plurality of holes provided through upper and lower portions of said windshield main body.

2. The windshield for the vehicle as set forth in claim 1, wherein said opening is substantially rectangular in shape.

3. The windshield for the vehicle asset forth in claim 1, further comprising:
    an adhesive layer provided between said stepped lip and said glass plate.

4. The windshield for the vehicle as set forth in claim 3, wherein said stepped lip is recessed into said forward surface by a distance which is approximately equal to a thickness of said glass plate plus a thickness of said adhesive layer.

5. The windshield for the vehicle as set forth in claim 1, wherein said glass plate is formed of tempered glass.

6. A windshield for a vehicle comprising:
    a windshield main body formed of a transparent resin; and
    a transparent adhesive layer having a first side attached to a portion of said windshield main body;
    a glass plate attached to a second side of said transparent adhesive layer, wherein said glass plate includes a surface to be wiped by a wiper; and
    a mounting portion formed on said windshield main body for mounting said windshield main body to a vehicle, wherein said mounting portion includes a plurality of holes provided through upper and lower portions of said windshield main body.

7. The windshield for the vehicle as set forth in claim 6, wherein said windshield main body is provided with a recessed portion and said transparent adhesive layer and said glass plate reside within said recessed portion.

8. The windshield for the vehicle as set forth in claim 7, wherein said transparent adhesive layer covers substantially all of said recessed portion.

9. The windshield for the vehicle as set forth in claim 7, wherein said recessed portion is recessed into a forward surface of said windshield main body by a distance which is approximately equal to a thickness of said glass plate plus a thickness of said transparent adhesive layer.

10. The windshield for the vehicle as set forth in claim 3, wherein said adhesive layer is transparent.

11. The windshield for the vehicle as set forth in claim 6, wherein said transparent adhesive layer covers substantially all of an area existing between said windshield main body and said glass plate.

12. The windshield for the vehicle as set forth in claim 6, wherein said glass plate is formed of tempered glass.

13. The windshield for the vehicle as set forth in claim 7, wherein said glass plate is formed of tempered glass.

* * * * *